United States Patent
Hong et al.

(10) Patent No.: US 9,052,441 B2
(45) Date of Patent: Jun. 9, 2015

(54) PRISM SHEET AND LIQUID CRYSTAL DISPLAY HAVING THE SAME

(75) Inventors: Sung-Hwan Hong, Suwon-si (KR);
Jeong-Uk Heo, Seongnam-si (KR);
Ho-Yun Byun, Hwaseong-si (KR);
Boo-Kan Ki, Seoul (KR); Min-Oh Choi, Asan-si (KR)

(73) Assignee: Samsung Display Co., Ltd. (KR)

( * ) Notice: Subject to any disclaimer, the term of this patent is extended or adjusted under 35 U.S.C. 154(b) by 1180 days.

(21) Appl. No.: 12/362,387

(22) Filed: Jan. 29, 2009

(65) Prior Publication Data

US 2010/0020262 A1   Jan. 28, 2010

(30) Foreign Application Priority Data

Jul. 22, 2008   (KR) .................. 10-2008-0071293

(51) Int. Cl.
*C09K 19/00* (2006.01)
*G02B 5/04* (2006.01)
*G02F 1/1335* (2006.01)

(52) U.S. Cl.
CPC .......... *G02B 5/045* (2013.01); *G02F 1/133606* (2013.01); *G02F 1/133611* (2013.01); *G02F 1/133615* (2013.01); *G02F 2001/133607* (2013.01); *G02F 2202/28* (2013.01)

(58) Field of Classification Search
CPC .... G02B 5/045; G02B 5/0231; G02B 5/0278; G02F 1/133606; G02F 1/133615; G02F 1/133611; G02F 2001/133607
USPC .................. 428/1.5, 1.1, 1.54, 1.55; 349/62; 359/831; 156/40; 362/97.1, 97.2, 97.4
See application file for complete search history.

(56) References Cited

U.S. PATENT DOCUMENTS

| | | | | |
|---|---|---|---|---|
| 5,574,117 | A | * 11/1996 | Yoshida et al. | 526/224 |
| 6,312,801 | B1 | * 11/2001 | Kim et al. | 428/355 CN |
| 2006/0103777 | A1 | 5/2006 | Ko et al. | |
| 2007/0231576 | A1 | * 10/2007 | Davis et al. | 428/412 |
| 2008/0248256 | A1 | * 10/2008 | Kim et al. | 428/172 |

FOREIGN PATENT DOCUMENTS

| | | | |
|---|---|---|---|
| KR | 2003-0032737 | | 4/2003 |
| KR | 20030032737 | * | 4/2003 |
| KR | 2007-0106397 | | 11/2007 |
| WO | WO 2005091063 A1 | * | 9/2005 |

* cited by examiner

*Primary Examiner* — Gwendolyn Blackwell
*Assistant Examiner* — Ruiyun Zhang
(74) *Attorney, Agent, or Firm* — Innovation Counsel LLP

(57) ABSTRACT

Disclosed is a dual layer prism sheet including two patterned prism sheets adhered to each other with an adhesive layer interposed therebetween. The adhesive layer includes a polymeric adhesive and a lubricant. A liquid crystal display including the dual layer prism sheet is also disclosed. Each pattern on the prism sheet is arranged to make a predetermined angle with a liquid crystal panel.

10 Claims, 4 Drawing Sheets

PRISM SHEET AND LIQUID CRYSTAL DISPLAY HAVING THE SAME

CROSS-REFERENCE TO RELATED APPLICATION

This application relies for priority upon Korean Patent Application No. 2008-71293 filed on Jul. 22, 2008, the contents of which are herein incorporated by reference in their entirety.

BACKGROUND OF THE INVENTION

1. Field of the Invention

The present invention relates to a prism sheet and a liquid crystal display including the same. More particularly, the present invention relates to a prism sheet having a dual layer structure using an adhesive and a liquid crystal display provided with the same.

2. Description of the Related Art

Recently, as various electronic appliances such as mobile phones, PDAs, computers and large-scale TVs have been developed, demands for flat panel display devices applicable thereto have increased.

Such flat panel display devices, which have been intensively studied up to now, include LCD (Liquid Crystal Display), PDP (Plasma Display Panel), FED (Field Emission Display), VFD (Vacuum Fluorescent Display), or the like. Among them, LCD has been currently highlighted in terms of mass production, simple driving scheme and high-quality images.

LCD is a display apparatus using optical anisotropy of liquid crystals, and displays images by controlling the light transmission of liquid crystals with an electric field.

An LCD includes a liquid crystal panel capable of displaying an image. Since the liquid crystal panel itself is a non-emissive device, the LCD further requires a backlight unit that provides the liquid panel with light.

The backlight unit includes optical sheets in order to increase the efficiency of light transmission when the light is provided to the liquid crystal panel. Recently, there is a tendency to eliminate some optical sheets from the backlight unit to reduce the manufacturing cost. However, when some optical sheets are partially removed, rectilinear propagation property of the light is deteriorated, resulting in a drop in luminance or contrast. Therefore, there is a need for a novel structure of an optical sheet that can improve the luminance as well as the contrast.

SUMMARY OF THE INVENTION

Therefore, an object of the present invention is to provide a prism sheet that can increase luminance and contrast of transmitted light.

It is another object of the present invention to provide a liquid crystal display having the above prism sheet.

In one aspect of the present invention, a prism sheet includes an upper prism sheet having a first pattern on one surface thereof, a lower prism sheet having a second pattern on one surface thereof, and an adhesive layer interposed between the upper prism sheet and the lower prism sheet to bind the upper prism sheet and the lower sheet with each other. The adhesive layer includes a polymeric adhesive and an amount more than 0 wt % and equal to or less than 30 wt % of a lubricant.

The lubricant includes at least one selected from the group consisting of polyethylene oil which has a molecular weight of 5,000-20,000 and contains $C_6$-$C_{20}$ alkyl or alkenyl groups, polyester oil which has a molecular weight of 5,000-20,000 and contains $C_6$-$C_{20}$ alkyl or alkenyl groups, $C_6$-$C_{20}$ paraffin oil, and $C_1$-$C_{20}$ silicone oil.

The polymeric adhesive has structural units represented by the following Formula 1 or Formula 2:

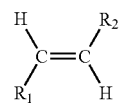

[Formula 1]

wherein $R_1$ is an alkyl or alkenyl having 6 to 20 carbon atoms and $R_2$ is —$COOC_2H_5$, —$COOC_4H_9$, —$OCOCH_3$, —CN, —$CONH_2$, —COOH, —$COOCH_3$, —$CH_2COOH$, —CH(COOH)$CH_2$COOH, —$CH_2COOCH_2CH_2OH$, —$CH_2COOCH_2CH(OH)CH_3$, —$CH_2COOCH_2CH_2N(CH_3)_2$, —CH=$CHCONH_2$, —$CHCONHCH_2OH$, or —$CH_2COOCH_2CHCOCH_2(CO)_2OH$.

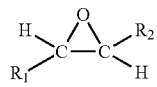

[Formula 2]

wherein $R_1$ is an alkyl or alkenyl having 6 to 20 carbon atoms and $R_2$ is —CH=$CCH_3COOCH_3$, —$CH_2CH_2CH_2CHCONH_2$, —CH=$CHCONHCH_2OH$, —$CH_2CHCONH_2$, CH=$CHCONHCH_2OH$, bisphenol A, epichlorohydrin, glycerin, tetraglycidyl ether, polyglycol, butyl-oxitol, phenol, primary amine, secondary amine, benzophenol, or Novolac resin(phenol formaldehyde resin).

The first pattern of the prism sheet includes protrusions extending along a first direction, and the second pattern of the prism sheet includes protrusions extending along a second direction. The protrusions may have various shapes, such as semi-circular shapes or polygonal shapes, on their sections perpendicular to the extending direction. The first direction and the second direction may be different from each other. Preferably, the first direction and the second direction make an angle of 90° with each other.

The first pattern and the second pattern may be formed to have various shapes. For example, the patterns include a plurality of vertically and horizontally arranged quadrangular pyramids.

In another aspect of the present invention, there is provided a liquid crystal display including the above prism sheet. The liquid crystal display according to the present invention includes a liquid crystal panel, a light source disposed in the rear of the liquid crystal panel to provide the liquid crystal panel with light, and the prism sheet interposed between the liquid crystal panel and the light source to collect the light generated from the light source in a direction perpendicular to the liquid crystal panel.

The prism sheet according to the present invention includes two prism sheets having surface patterns and attached to each other with an adhesive layer including adhesive and a lubricant interposed therebetween, which acts as one layer prism sheet. Thus, damage to the surface patterns of the prism sheets is reduced. Since the prism sheet has a dual layer structure causing no damage to the surface patterns, even a single prism sheet can increase the rectilinear propagation property of the light transmitted through the liquid crystal panel, and thus can increase the luminance.

In addition, the patterns of the prism sheets attached to each other with the adhesive layer interposed therebetween may be arranged with a predetermined angle depending on the liquid crystal alignment of the liquid crystal panel so as to increase the white luminance while reducing the black luminance or increasing the black luminance by a smaller degree as compared to the white luminance, thereby increasing the overall contrast of the transmitted light.

As a result, the present invention provides a liquid crystal display having an improved luminance and contrast ratio.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Figure 1:
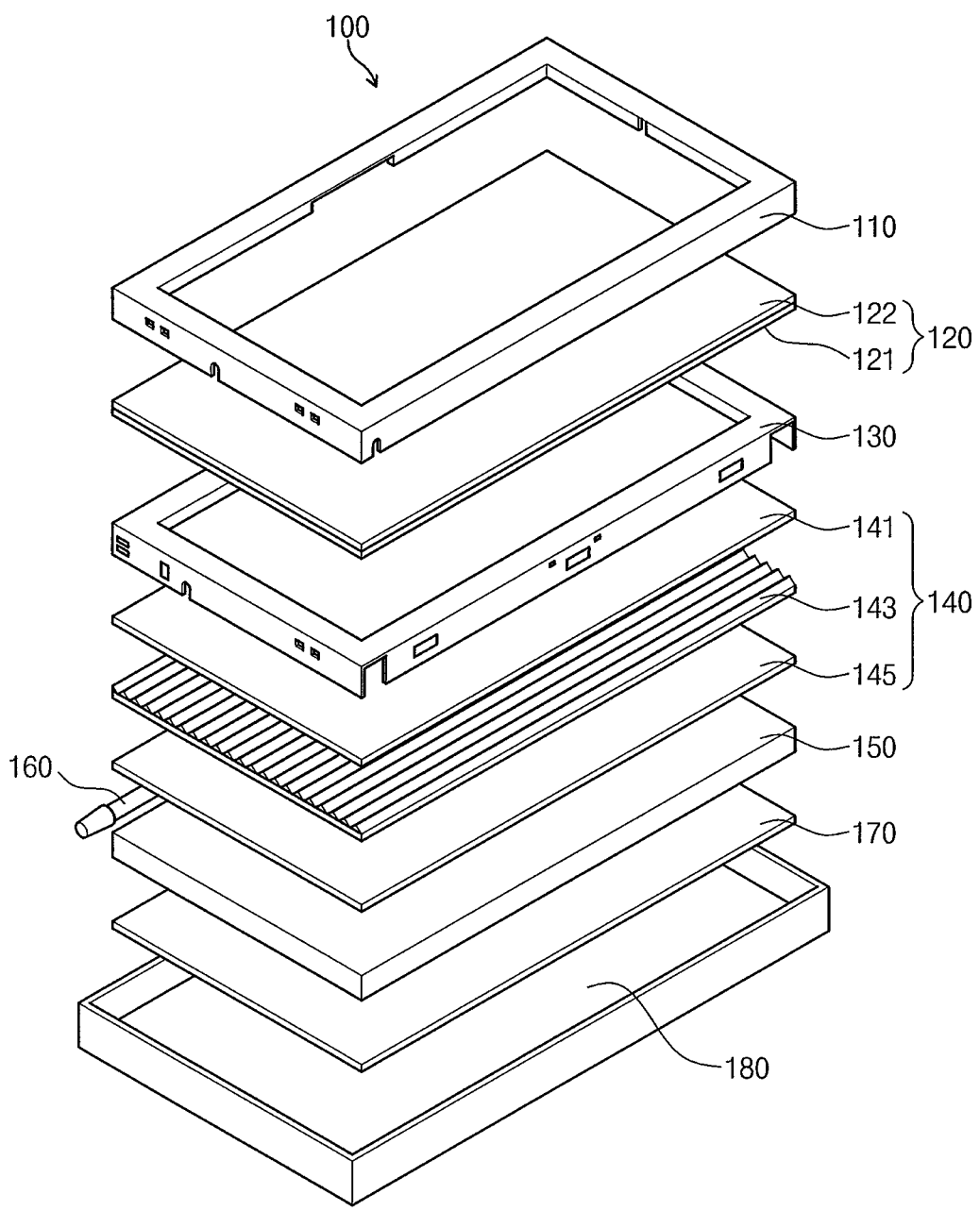
FIG. 1 is a schematic exploded perspective view showing a liquid crystal display according to one embodiment of the present invention.

Hereinafter, the present invention will be explained in detail with reference to the accompanying drawings. In the following description, a fluorescent lamp will be used as a light source in an edge type backlight unit, in which the light source is positioned at one side of a liquid crystal panel. However, the present invention is not limited thereto but various light sources such as a light emitting diode may be applied, or a direct illumination type backlight unit, in which a plurality of light sources are positioned on the bottom of the liquid crystal panel, is also within the spirit and scope of the present invention.

An embodiment of the liquid crystal display according to the present invention will be described hereinafter. It should be understood that the present invention is not limited to appended drawings but includes all modifications, equivalents and alternatives within the spirit and scope of the present invention as defined in the following claims. The appended drawings are not necessarily to scale, presenting a somewhat extended or reduced representation of partial elements to illustrate various layers and regions more clearly. In the figures, reference numerals refer to the same or equivalent parts of the present invention throughout the figures of the drawing. Further, for the sake of convenience, a direction in which the light exits as viewed from the liquid panel is taken as the top and the opposite direction is taken as the bottom.

FIG. 1 is a schematic exploded perspective view showing a liquid crystal display according to one embodiment of the present invention.

As shown in FIG. 1, the liquid crystal display 100 includes a liquid crystal panel 120 that forms an image, a mold frame 130 that supports the edge of the liquid crystal panel 120, optical sheets 140 provided below the mold frame 130, a light guide plate 150 disposed below the optical sheets 140, a light source 160 disposed at one side of the light guide plate 150, a reflection sheet 170 disposed below the light guide plate, and an upper cover 110 and a lower cover 180 coupled to each other so as to receive the above parts therein.

The upper cover 110 is a structure supporting the front edge of the liquid crystal panel 120. The upper cover 110 includes a display window through which the display region of the liquid crystal panel 120 is exposed. Additionally, the upper cover 110 further includes screw-threaded holes (not shown) provided on the lateral surface thereof to be coupled to the lower cover 180 as described hereinafter.

The liquid crystal panel 120 has the shape of a rectangular sheet having longer sides and shorter sides, and includes a first substrate 121, a second substrate 122 facing the first substrate 121, and liquid crystals (not shown) formed between the first substrate and the second substrate. The first substrate and the second substrate may include a thin film transistor and a color filter, respectively. In this case, the first substrate and the second substrate may be referred to as a thin film transistor substrate and a color filter substrate, respectively.

The first substrate includes a plurality of gate lines and data lines crossing each other in a matrix form to define pixels. A thin film transistor is formed in the intersection region of the gate line and the data line in each pixel.

Although it is not shown in the figure, the liquid crystal panel may include a printed circuit board connected to the thin film transistor of the liquid crystal panel. The printed circuit board may be provided at one side of the liquid crystal panel. The signals output from the printed circuit board is transmitted to the thin film transistor through interconnections such as gate lines and data lines, and the thin film transistor applies a voltage to the pixels according to the signals, thereby driving the liquid crystal layer.

The mold frame 130 is provided along the edge of the liquid crystal panel 120. The mold frame substantially takes the form of a quadrangular ring. The mold frame 130 supports the liquid crystal panel 120 and the optical sheets 140, while causing the optical sheets to be spaced apart from the liquid crystal panel by a predetermined distance, if necessary. The mold frame 130 is coupled to the lower cover 180 as described hereinafter to receive the optical sheet 140, the light guide plate 150, the light source 160 and the reflection sheet 170 therein.

The optical sheets 140 includes a protection sheet 141, a prism sheet 143 and a diffusion sheet 145, which are positioned on the rear side of the liquid crystal panel 120. The diffusion sheet 145 diffuses the light emitted from the light source before the light is provided to the liquid crystal panel 120. Two or three layers of such diffusion sheets 145 may be stacked.

The prism sheet 143 functions to collect the light diffused by the diffusion sheet 145 in a direction perpendicular to the plane of the overlying liquid crystal panel 120. Most of the light transmitted through the prism sheet 143 propagates in the vertical direction to provide a uniform luminance distribution. According to one embodiment of the present invention, the prism sheet includes a patterned upper prism sheet and a patterned lower prism sheet attached to each other by an adhesive. The prism sheet will be described in more detail hereinafter.

The uppermost part, the protection sheet 141 protects the prism sheet 143 from scratches.

The light guide plate 150 is disposed on the rear side of the liquid crystal panel 120 to guide the light generated from the light source 160 toward the rear surface of the liquid crystal panel 120. The light guide plate 150 may have a patterned surface so that the incident light from the light source 160 propagates toward the liquid crystal panel 120. The rear surface of the light guide plate faces the reflection sheet 170. Thus, the light guide plate 150 transforms the light irradiated from the light source 160 onto the incident surface of the light guide plate into planar light, which, in turn, is transferred uniformly to the liquid crystal panel 120 through the exit surface. In general, the light guide plate 150 is fabricated in the form of a rectangle having longer sides and shorter sides. Meanwhile, in another preferred embodiment, the light guide plate 150 may be fabricated in the form of a wedge in which the thickness of the light guide plate 150 decreases from one side to the other side.

The light source 160 is disposed at a lateral side of the light guide plate 150. The light source that may be used includes a cold cathode fluorescence lamp (CCFL), external electrode fluorescent lamp (EEFL) or light emitting diode (LED). A reflection sheet 170 is disposed below the light guide plate 150. The reflection sheet 170 causes a part of the light generated from the light source 160 and entering the lower part of the light guide plate 150 to be reflected toward the upper part thereof.

Figure 2:
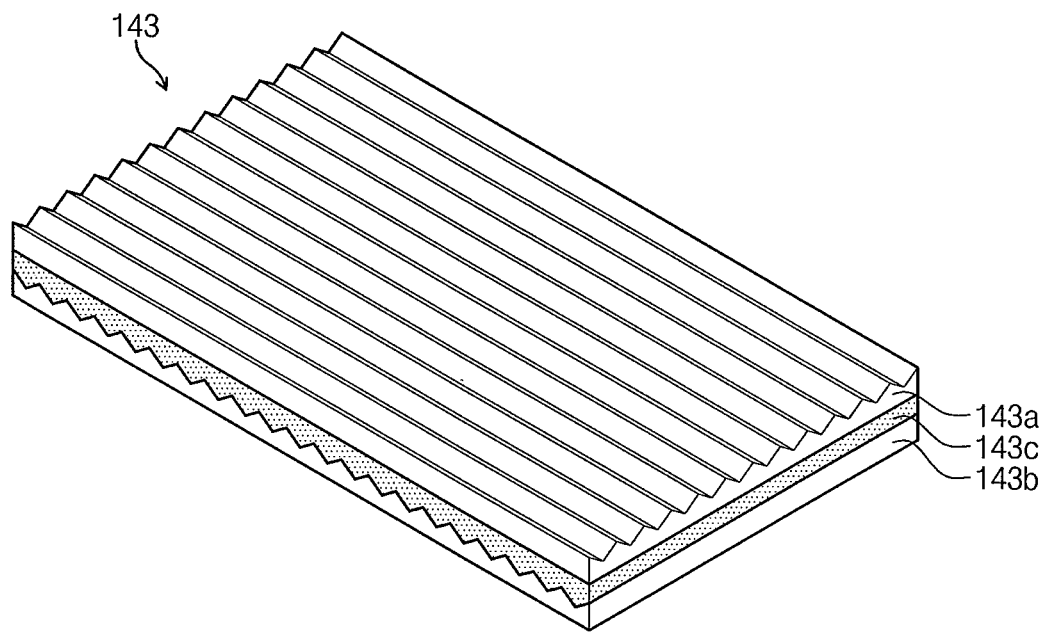
FIG. 2 is a perspective view showing a prism sheet according to one embodiment of the present invention.

FIG. 2 is a perspective view showing a prism sheet according to one embodiment of the present invention. Referring to FIG. 2, the prism sheet 143 according to one embodiment of the present invention has a dual layer laminate structure wherein an upper prism sheet 143a having a first pattern on one surface thereof and a lower prism sheet 143b having a second pattern on one surface thereof are bound to each other with an adhesive layer 143c interposed between the upper prism sheet and the lower prism sheet.

In the embodiment show in FIG. 2, the upper prism sheet and the lower prism sheet have patterns extending along a first direction and a second direction, respectively, wherein the first direction and the second direction make a right angle with each other. In other words, the first direction and the second direction may be perpendicular to each other.

The adhesive layer 143c comprises a polymeric adhesive and a lubricant. The lubricant functions to prevent the pattern of the lower prism sheet from being damaged upon the adhesion between the upper prism sheet 143a and the lower prism sheet 143b.

The prism sheet 143 is obtained by providing the upper prism sheet 143a and the lower prism sheet 143b individually, and binding both prism sheets with an adhesive (or cohesive). The adhesion between both prism sheets 143a, 143b may be carried out by laminating one prism sheet with the other prism sheet. Particularly, the dual layer prism sheet can be formed not by providing a finished product through a simple injection or printing process, but by providing individual rolls of the upper prism sheet 143a and the lower prism sheet 143b and laminating both rolls with each other while the adhesive is interposed between both rolls. However, when using a conventional adhesive to form the dual layer prism sheet in the above manner, the prism patterns (particularly the peak portions) may be damaged, for example, by wearing or scratching. Therefore, the prism sheet according to one embodiment of the present invention uses a highly lubricative adhesive to prevent damage of the prism pattern.

Particularly, the lubricant that may be added to the adhesive component includes polyethylene oil or polyester oil containing $C_6$-$C_{20}$ alkyl or alkenyl groups, $C_6$-$C_{20}$ paraffin oil, and $C_1$-$C_{20}$ silicone oil. Such lubricants may be used alone or in combination. The polyethylene oil or polyester oil also has a molecular weight of 5,000-20,000.

Figure 3:
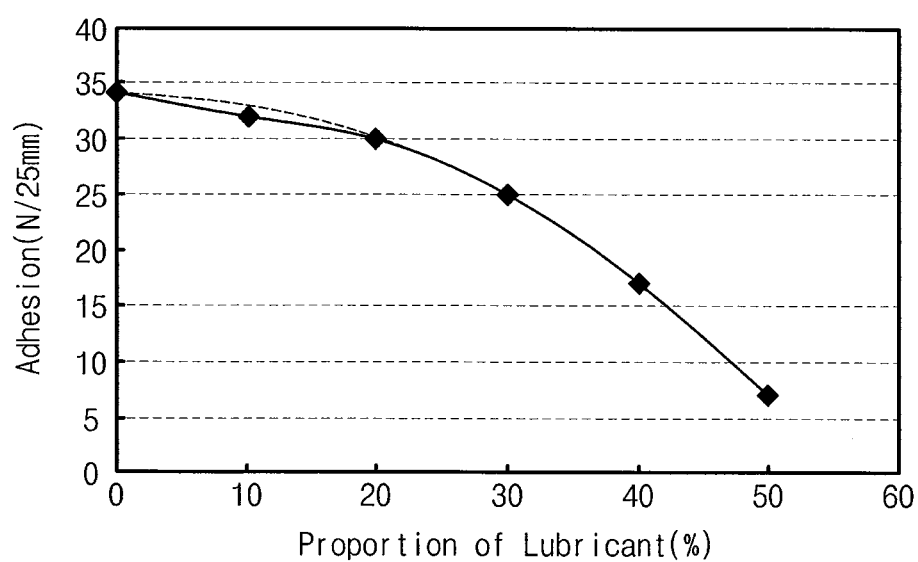
FIG. 3 is a graph showing the adhesion of an adhesive layer as a function of the weight ratio of a lubricant to an adhesive.

FIG. 3 is a graph showing the adhesion of an adhesive layer as a function of the weight ratio of a lubricant to an adhesive. As the proportion of the lubricant increases, the adhesive layer has a higher lubrication property. However, as shown in the graph, as the proportion of the lubricant increases, the adhesion decreases. To make stable adhesion between both prism sheets, the adhesive layer provides an adhesion of at least 25 N/25 mm. Thus, the proportion of the lubricant should be controlled to obtain an adhesion of at least 25 N/25 mm.

Referring to FIG. 3, when the amount of the lubricant is 30 wt % or less, an adhesion greater than 25 N/25 mm can be obtained so that the adhesive functions well. Therefore, the proportion of the lubricant is preferably greater than 0% and equal to or less than 30% on the weight basis.

The polymeric adhesive that may be used includes an acrylate adhesive or an epoxy adhesive. Herein, the polymeric adhesive also shows a lubrication effect to prevent the prism pattern from being damaged by pressurizing the lower prism sheet when both prism sheets are adhered to each other. Particularly, when the polymer has $C_6$-$C_{20}$ alkyl or alkenyl side chains, the polymer itself shows increased fluidity so that it can provide a lubrication effect like oil.

Therefore, the polymeric adhesive according to one embodiment of the present invention has structural units represented by the following Formula 1 or Formula 2 as a monomer respectively:

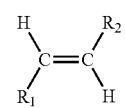

[Formula 1]

wherein $R_1$ is an alkyl or alkenyl having 6 to 20 carbon atoms; and $R_2$ is —COOC$_2$H$_5$, —COOC$_4$H$_9$, —OCOCH$_3$, —CN, —CONH$_2$, —COOH, —COOCH$_3$, —CH$_2$COOH, —CH(COOH)CH$_2$COOH, —CH$_2$COOCH$_2$CH$_2$OH, —CH$_2$COOCH$_2$CH(OH)CH$_3$, —CH$_2$COOCH$_2$CH$_2$N(CH$_3$)$_2$, —CH═CHCONH$_2$, —CHCONHCH$_2$OH, or —CH$_2$COOCH$_2$CHCOCH$_2$(CO)$_2$OH.

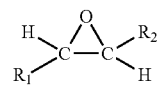

[Formula 2]

wherein $R_1$ is an alkyl or alkenyl having 6 to 20 carbon atoms and $R_2$ is —CH═CCH$_3$COOCH$_3$, —CH$_2$CH$_2$CH$_2$CHCONH$_2$, —CH═CHCONHCH$_2$OH, —CH$_2$CHCONH$_2$, CH═CHCONHCH$_2$OH, bisphenol A, epichlorohydrin, glycerin, tetraglycidyl ether, polyglycol, butyl-oxitol, phenol, primary amine, secondary amine, benzophenol, or Novolac resin.

Figure 4A:
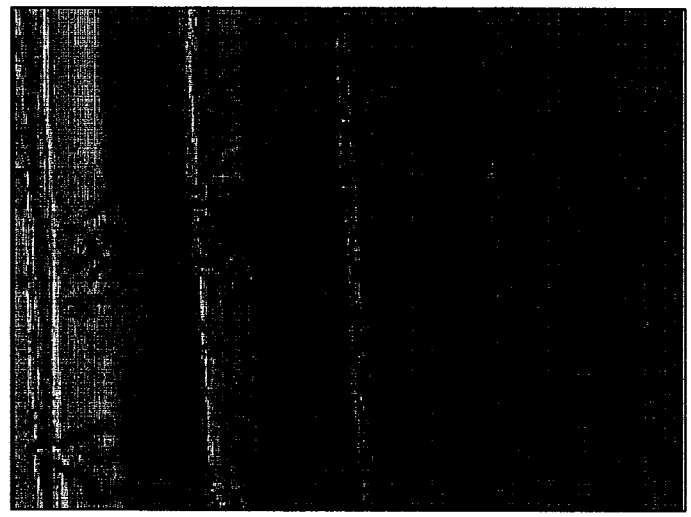
FIGS. 4A and 4B are photographic views showing the surfaces of lower prism sheets when the lower prism sheets are adhered to upper prism sheets by using a conventional adhesive and an adhesive according to one embodiment of the present invention, respectively.
Figure 4B:
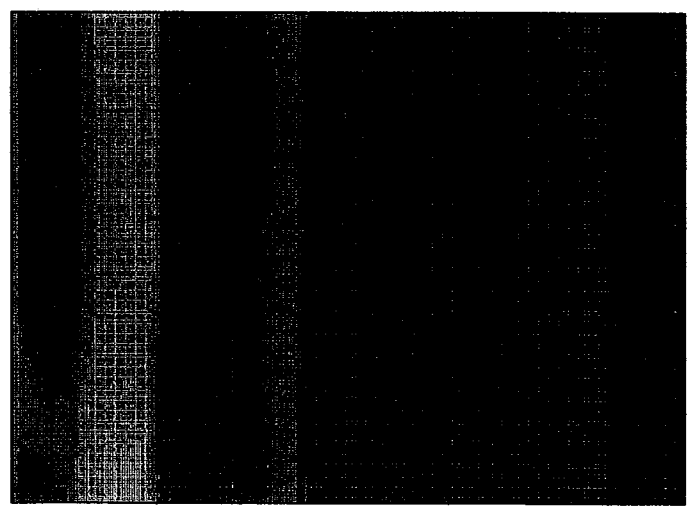

FIGS. 4A and 4B are photographic views showing the surfaces of lower prism sheets when the lower prism sheets are adhered to upper prism sheets by using a conventional adhesive and an adhesive according to one embodiment of the present invention, respectively. FIG. 4A shows the surface of the lower prism sheet using the conventional adhesive, while FIG. 4B shows the surface of the lower prism sheet using the adhesive according to one embodiment of the present invention.

Referring to FIGS. 4A and 4B, when two prism sheets are adhered to each other by using the conventional adhesive, the surface of the prism sheet is worn or scratched (see FIG. 4A). However, when two prism sheets are adhered to each other by using the adhesive according to one embodiment of the present invention, damage on the surface of the prism sheet is significantly reduced (see FIG. 4B). As a result, the prism sheet according to one embodiment of the present invention provides an increase in light dose transmitted therethrough.

The prism sheet pattern is to collect the light toward the liquid crystal panel. Thus, when the upper prism sheet is adhered to the lower prism sheet, the upper prism sheet and the lower prism sheet are preferably disposed to have their patterns on the top surfaces thereof. As a result, the light transmitted through the upper and lower prism sheets shows improved rectilinear propagation property.

Figure 5A:
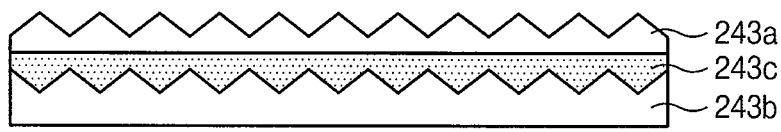
FIGS. 5A to 5C are sectional views of upper prism sheets and lower prism sheets having various patterns according to different embodiments of the present invention.
Figure 5B:
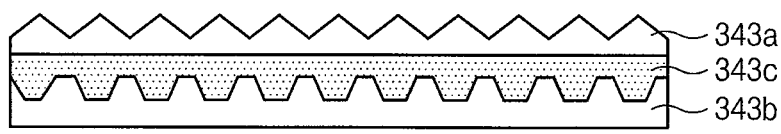
Figure 5C:
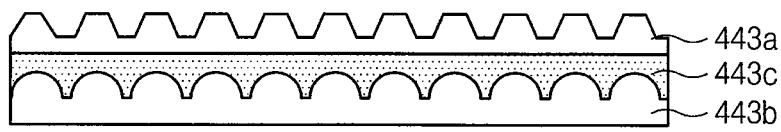

Each of the upper prism sheet and the lower prism sheet includes a pattern having concavo-convex geometry on one surface. FIGS. 5A to 5C are sectional views of upper prism sheets and lower prism sheets having various patterns according to different embodiments of the present invention. In the figures, reference numerals refer to the same or equivalent parts of the present invention throughout the figures of the drawing.

As shown in the figures, when the patterns formed on the upper prism sheet and on the lower prism sheet are taken as the first pattern and the second pattern, respectively, the first pattern and the second pattern are dents and protrusions arranged vertically and horizontally. Each pattern may have various shapes including polygonal pyramids, such as a triangular pyramid or quadrangluar pyramid, or semi-spheres.

Additionally, the first pattern and the second pattern may extend along a first direction and a second direction, respectively. When the extending direction of the first pattern and that of the second pattern are taken as the first direction and the second direction, respectively, the shape of the section of the protrusion of the first pattern perpendicular to the first direction and the section of the protrusion of the second pattern perpendicular to the second direction may have a semi-circular or polygonal (e.g. triangular or rectangular) shape.

Preferably, the first direction and the second direction are different from each other. More preferably, both directions make a right angle with each other. When only a single prism sheet having a pattern extending along one direction is used, the light entering in a certain direction may be reflected or scattered in another direction. However, when another prism sheet having a pattern extending along another direction is additionally used, even the light entering in a certain direction can propagate toward the liquid crystal panel. Therefore, the light shows improved rectilinear propagation property. The best rectilinear propagation is accomplished when the first direction and the second direction make a right angle with each other.

Additionally, when the liquid crystal panel is in a mode of twisted nematic (TN), the first direction and the second direction exist at about 45° and about −45° (or 135°), respectively, based on the longer side of the liquid crystal panel. When the liquid crystal panel is in a mode of vertical alignment (VA), both directions preferably exist at about 0° and about 90° (or −90°), respectively, based on the longer side of the liquid crystal panel. This is because the light transmission axis varies with the particular type of the liquid crystal panel due to different rubbing-based liquid crystal alignments of different liquid crystal panel modes. For example, in the case of a TN liquid crystal panel, the light transmission axis exists at about 45° based on the longer side of the liquid crystal panel. On the contrary, in the case of a VA liquid crystal panel, the light transmission axis exists at about 0° based on the longer side of the liquid crystal panel. Since the light transmission axis orients toward a certain direction, the light dose transmitted through the liquid crystal panel decreases in a direction other than the light transmission axis even if the light is provided uniformly. Therefore, the extending direction of the first pattern or the second pattern is determined considering the light transmission axis to provide the light as uniformly as possible in parallel with the light transmission axis.

The following Table 1 shows the white luminance, black luminance and contrast in different arrangements of the optical sheet including the upper prism sheet and the lower prism sheet. Each example in the following table has the following constitution, wherein the angle is one made by the longer side of the liquid crystal panel with the extending direction of the prism sheet pattern, and each optical sheet is described from the bottom to the top.

Comparative Example 1: diffusion sheet+a sheet of monolayer prism sheet (0°)

Comparative Example 2: diffusion sheet+a sheet of monolayer prism sheet (45°)

Comparative Example 3: CL diffusion sheet+a sheet of monolayer prism sheet (−45°)

Example 1: diffusion sheet+a sheet of dual layer prism sheet (upper prism sheet 0°+lower prism sheet 90°)

Example 2: diffusion sheet+a sheet of dual layer prism sheet (upper prism sheet −90°+lower prism sheet 0°)

Example 3: a sheet of dual layer prism sheet (upper prism sheet 90°+lower prism sheet 0°)

Example 4: a sheet of dual layer prism sheet (upper prism sheet 0°+lower prism sheet 90°)

Example 5: diffusion sheet+a sheet of dual layer prism sheet (upper prism sheet 45°+Lower Prism Sheet −45°)

Example 6: diffusion sheet+a sheet of dual layer prism sheet (upper prism sheet −45°+Lower Prism Sheet 45°)

TABLE 1

|  | White Luminance | Black Luminance | Contrast | Increment(%) in White Luminance Vs. Comp. Ex. 1 | Increment(%) in Black Luminance Vs. Comp. Ex. 1 | Increment(%) in Contrast Vs. Comp. Ex. 1 |
|---|---|---|---|---|---|---|
| Comp. Ex. 1 | 277 | 0.25 | 1122 | — | — | — |
| Comp. Ex. 2 | 250 | 0.22 | 1147 | −9.78 | −11.74 | 2.22 |
| Comp. Ex. 3 | 259 | 0.23 | 1129 | −6.68 | −7.29 | 0.66 |
| Ex. 1 | 359 | 0.28 | 1277 | 29.52 | 13.77 | 13.85 |
| Ex. 2 | 351 | 0.28 | 1255 | 26.78 | 13.36 | 11.84 |

TABLE 1-continued

| | White Luminance | Black Luminance | Contrast | Increment(%) in White Luminance Vs. Comp. Ex. 1 | Increment(%) in Black Luminance Vs. Comp. Ex. 1 | Increment(%) in Contrast Vs. Comp. Ex. 1 |
|---|---|---|---|---|---|---|
| Ex. 3 | 319 | 0.26 | 1252 | 15.19 | 3.24 | 11.58 |
| Ex. 4 | 320 | 0.27 | 1185 | 15.45 | 9.31 | 5.61 |
| Ex. 5 | 313 | 0.24 | 1297 | 12.78 | −2.43 | 15.58 |
| Ex. 6 | 293 | 0.22 | 1314 | 5.77 | −9.72 | 17.16 |

As can be seen from Table 1, when compared to a sheet of the conventional monolayer prism sheet, the inventive examples using a sheet of the dual-layer prism sheet structure (Examples 1-6) show an increase in both the contrast and the white luminance. Such an increase in the overall contrast results from the fact that while the white luminance increases, the black luminance does not increase as much as the white luminance does, or the black luminance even decreases. This suggests that the dual layer prism sheets according to the inventive examples reinforce the rectilinear propagation property of the light.

In Examples 1 and 2, the white luminance highly increases in the structure in which two prism sheets have an angle of 0° and 90° to make a right angle with each other. Although the black luminance also increases in Examples 1 and 2, the increment in the black luminance is smaller than the increment in the white luminance, resulting in an overall increase in the contrast. Additionally, in Examples 5 and 6, the white luminance does not increase significantly but the black luminance decreases, resulting in an overall increase in the contrast.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display comprising:
   a liquid crystal panel;
   a light source disposed in the rear of the liquid crystal panel and providing the liquid crystal panel with light; and
   a prism sheet interposed between the liquid crystal panel and the light source, the prism sheet collecting light generated from the light source in a direction perpendicular to the liquid crystal panel,
   wherein the prism sheet comprises:
      an upper prism sheet having a first pattern on one surface thereof and an opposite surface that is flat;
      a lower prism sheet having a second pattern on one surface thereof; and
      an adhesive layer interposed between the upper prism sheet and the lower prism sheet to bind the upper prism sheet and the lower prism sheet with each other, the adhesive layer comprising a polymeric adhesive and an amount of a lubricant greater than 0 wt % and equal to or less than about 30 wt % of total adhesive in the adhesive layer,
   wherein the polymeric adhesive has structural units used to increase a fluidity of the polymeric adhesive derived from the following:

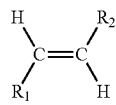

wherein $R_1$ is an alkyl or alkenyl having 6 to 20 carbon atoms; and
$R_2$ is —OCOCH$_3$, —CONH$_2$, —CH(COOH)CH$_2$COOH, —CH$_2$COOCH$_2$CH$_2$OH, —CH$_2$COOCH$_2$CH(OH)CH$_3$, —CH$_2$COOCH$_2$CH$_2$N(CH$_3$)$_2$, —CH═CHCONH$_2$, —CHCONHCH$_2$OH, or —CH$_2$COOCH$_2$CHCOCH$_2$(CO)$_2$OH.

2. The liquid crystal display of claim 1, wherein the lubricant comprises at least one selected from the group consisting of polyethylene oil having a molecular weight of 5,000-20,000 and containing C$_6$-C$_{20}$ alkyl or alkenyl groups, polyester oil and having a molecular weight of 5,000-20,000 and containing C$_6$-C$_{20}$ alkyl or alkenyl groups, C$_6$-C$_{20}$ paraffin oil, and C$_1$-C$_{20}$ silicone oil.

3. The liquid crystal display of claim 1, wherein the first pattern comprises protrusions laterally extending along a first direction, and the second pattern comprises protrusions laterally extending along a second direction.

4. The liquid crystal display of claim 3, wherein the first direction and the second direction are different from each other.

5. The liquid crystal display of claim 4, wherein the first direction and the second direction make an angle of 90° with each other.

6. The liquid crystal display of claim 5, wherein a longer side of the liquid crystal panel and the first direction make an angle of 45° with each other.

7. The liquid crystal display of claim 5, wherein a longer side of the liquid crystal panel and the first direction make an angle of 135° with each other.

8. The liquid crystal display of claim 5, wherein a longer side of the liquid crystal panel and the first direction make an angle of 0° with each other.

9. The liquid crystal display of claim 5, wherein a longer side of the liquid crystal panel and the first direction make an angle of 90° with each other.

10. The liquid crystal display of claim 1, wherein the adhesive layer contacts with the second pattern and the opposite surface.

* * * * *